United States Patent [19]
Meier et al.

[11] 3,827,447

[45] Aug. 6, 1974

[54] METHOD AND COMPOSITION FOR REDUCING THE FRICTIONAL DRAG OF FLOWING FLUIDS

[75] Inventors: Dale J. Meier, El Cerrito, Calif.;
Vitold R. Kruka, Houston, Tex.

[73] Assignee: Shell Oil Company, New York, N.Y.

[22] Filed: Dec. 12, 1973

[21] Appl. No.: 424,147

Related U.S. Application Data

[62] Division of Ser. No. 204,357, Dec. 2, 1971.

[52] U.S. Cl. .................... 137/13, 208/370, 252/8.55
[51] Int. Cl. .............................................. F17d 1/16

[58] Field of Search ........... 137/1, 13; 252/83, 8.55; 208/370

[56] References Cited
UNITED STATES PATENTS

3,687,148   8/1972   Kruka .................................. 137/13

*Primary Examiner*—Alan Cohan

[57] ABSTRACT

The flow properties of non-aqueous liquids are improved by the incorporation thereinto of hydrogenated polyisoprene.

3 Claims, No Drawings

METHOD AND COMPOSITION FOR REDUCING THE FRICTIONAL DRAG OF FLOWING FLUIDS

This is a division of application Ser. No. 204,357, filed Dec. 2, 1971.

BACKGROUND OF THE INVENTION

In the transferral of liquids by fluid flow it is well known that energy is required to overcome friction encountered in the movement of the liquid. When a fluid is pumped or transferred under pressure, the frictional loss is apparent as a pressure drop along the pipe or conduit in which the liquid is being transferred. Pressure drops such as these are generally large under conditions where the velocity of the liquid exceeds the critical limit for laminer flow. High frictional losses characteristically accompanying non-laminar flow generally occur in industrial operations wherein high fluid velocities are necessary, for example in the movement of large volumes of fluid over great distances such as in petroleum pipelines.

Considerable amounts of energy must necessarily be expended to compensate for the pressure drops caused by such friction loss. Therefore, it is manifest that a reduction in such friction loss would result in lowering operating pressures and in return would reduce power requirements. Likewise, using the same power input, increased flow rates could be achieved.

The addition of various materials as friction reducers has been proposed in the prior art. For example, the effectiveness of cis-polyisoprene as a friction reducing agent is brought out in U.S. Pat. Nos. 3,215,154 and 3,493,000. While polyisoprene is indeed an excellent friction reducing agent, as demonstrated by these two patents, hydrogenated polyisoprene is an even better friction reducing agent as will be shown hereinafter.

The use of ethylene-propylene copolymer is also known as a friction loss reduction additive as shown in U.S. Pat. Nos. 3,351,079 and 3,495,000. Ethylene-propylene copolymer bears resemblance to hydrogenated polyisoprene in that both appear to be copolymers of ethylene and propylene. The chief difference between the two polymers resides in structure. Thus, if A represents ethylene monomer and B propylene monomer, the units A and B in a hydrogenated polyisoprene molecule are arranged alternatively, e.g., A–B–A–B–A–B–A–B–. By comparison, in the ethylene-propylene copolymer the units A and B can be arranged at random, e.g., A–B–A–A–B–A–B–B–, or in blocks, A–A–B–B–A–A–B–B–B–B–. This difference has a profound effect on properties and the superiority of the hydrogenated polyisoprene to the ethylene-propylene copolymer will be shown hereinafter.

The present invention provides a successful and improved solution to the above noted problem of the prior art, as will be apparent from the following description thereof.

SUMMARY OF THE INVENTION

The primary purpose of this invention resides in providing a composition and method for the reduction of friction loss in flowing non-aqueous fluids, which composition and method are superior to others in the prior art.

The above purpose has been achieved through the utilization of hydrogenated polyisoprene as a friction loss additive.

The composition of this invention broadly extends to a non-aqueous liquid medium having dispersed therein from about 1 ppm to about 2,000 ppm of hydrogenated polyisoprene.

The method of this invention broadly extends to reducing fluid flow friction loss in the transfer of a non-aqueous liquid medium through a pipe or conduit which involves intermixing with the medium from about 1 ppm to about 2,000 ppm of hydrogenated polyisoprene and flowing the intermixed medium and hydrogenated polyisoprene through the pipe or conduit.

Within the framework of the above described method and composition, the present invention not only solves the above mentioned problem of the prior art, but also achieves further significant advantages as will be apparent from the description of preferred embodiments following.

DESCRIPTION OF THE PREFERRED EMBODIMENTS

According to the teachings of the present invention, the above purpose is achieved by adding to the non-aqueous fluid to be transferred small amounts of hydrogenated polyisoprene. This polymer, which is soluble in a large number of non-aqueous fluids at the concentrations which are desired, has been found to reduce friction loss by as much as 27% when present in quantities as low as 2 ppm based on a non-aqueous fluid, or 45% reduction with 11 ppm concentration. These representative values vary based on the average molecular weight of the polymer, flow conditions and solvent power of the fluid.

The non-aqueous liquids incorporated by the invention especially include hydrocarbon liquids such as crude oil and fractions thereof, it being understood that the present invention is particularly adapted to reducing friction loss in the transportation of crude oil through great distances in a pipeline. However, the problem of high friction loss caused by non-laminar flow is frequently met in a variety of industrial operations involving other non-aqueous fluids wherein use of the present invention is particularly desirable and beneficial.

Hydrogenated polyisoprene has been prepared commercially for some time by a number of processes well known in the art, for example see the following U.S. patents relating to hydrogenation: U.S. Pat. No. 2,693,461, 3,113,986, 2,093,096, 2,046,160, 3,130,257. Chemically, the completely hydrogenated polymer is a long chain linear hydrocarbon consisting of the following repeating units:

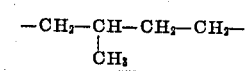

The hydrogenation need not be carried to completion and hydrogenation levels between 50 and 100% are broadly suitable for the present usage. The use of complete hydrogenation gives the polymer better shear stability and solubility characteristics while partial hydrogenation appears to only give better solubility characteristics compared to polyisoprene.

While significant reductions in frictional losses are observed with the addition of hydrogenated polyisoprene having a viscosity average molecular weight lower than $1 \times 10^5$, it is preferable that the polymer have a viscosity average molecular weight greater than $1 \times 10^5$. And, it is especially preferred that the polymer have a viscosity average molecular weight in the range of from about $1 \times 10^5$ to $2 \times 10^7$.

It is preferred that the hydrogenated polyisoprene for use with this invention predominantly be hydrogenated 1,4 polyisoprene. For example, a hydrogenated polyisoprene found particularly effective is approximately 92% cis 1,4; 4% trans 1,4 and 4% 3,4; or, altogether, about 96% 1,4 polyisoprene.

Hydrogenated polyisoprene affords effective friction reduction when present in concentrations as low as 1 ppm, and under some conditions may afford worthwhile reductions at even lower concentrations although it is generally preferred that the polymer be present in higher concentrations. While the polymer may be present in concentrations greater than 2,000 parts per million, it is generally not necessary to use such high concentrations. Accordingly, a range of from about 1 ppm to about 2,000 ppm is preferred for use with the invention. Of course, the optimum amount of polymer will vary depending on the molecular weight of the polymer and the flow conditions of the liquid. Generally, appreciable and economical reduction in friction loss under conditions of turbulent flow may be had with very little hydrogenated polyisoprene.

Usually, the presence of the polymer in the non-aqueous liquid in small amounts does not affect the eventual use of the non-aqueous liquid. However, it is feasible to remove the polymer from the fluid once its purpose has been served although this is not generally economical.

Persuant to practice of the present invention, the hydrogenated polyisoprene may be intermixed directly with the non-aqueous fluid as a solid. Alternatively, an additive concentrate may be prepared by dissolving the polymer in kerosene or other suitable liquid. In order to increase the rate of solution, the concentrate mixture can be heated up to 200°F without serious detrimental effect on subsequent friction loss reduction. Higher temperatures may cause problems since hydrogenated polyisoprene is known to decompose at temperatures above about 620°F even in the absence of oxygen.

The following examples are presented to demonstrate the improvements of the invention and are not intended as limiting thereof. Thus, as will be shown hereinafter, hydrogenated polyisoprene is more shear stable than polyisoprene. Shear stability of polymer additives is beneficial whenever such additives are subjected to shearing forces, for example as friction reduction agents, lube oil additives, and wax improvers. Also as will be shown hereinafter, hydrogenated polyisoprene is more readily dissolved in hydrocarbon liquids than ethylenepropylene copolymer. Ease of dissolution is of critical importance in view of its effect upon the economy of the process.

EXAMPLE I

The superior shear stability of a hydrogenated sample of cis-polyisoprene was tested and compared with its non-hydrogenated polisoprene precursor. Both samples had a weight average molecular weight of 400,000 and both samples were tested at a concentration of 400 ppm in cyclohexane. The test system consisted of a 4-foot long 0.143 inch I.D. glass tube with pressure taps located 7 inches apart in the fully developed portion of the flow. The sample solution was circulated through the system by means of two 5-inch diameter pistons at the opposing ends of the glass tube. This method of pumping the solutions eliminated the high intensity shear degradation of the polymers which takes place in conventional pumps, especially contrifugal pumps.

The solutions were recirculated through the flow system at a wall shear stress of 6,000 dynes/cm². The wall shear stress is given by $\gamma_w = (D\ dp/4)ex$ where D is the pipe diameter and $dp/dx$ the pressure gradient. The results, shown in Table I, are reported in terms of percent friction reduction and number of passes through the system. The percent friction reduction is given by $F = 100 \times (f_N - f)/f_N$ where $f_N$ and $f$ are the solvent and solution friction factors respectively and read as $$f = \frac{D}{4}\frac{dp}{dx} \bigg/ \frac{1}{2} \rho U^2$$

where $\rho$ and U are the density and bulk velocity.

Table I

| Number of Passes | Percent Friction Reduction | |
|---|---|---|
| | Polyisoprene | Hydrogenated Polyisoprene |
| 1 | 10.6 | 24.9 |
| 10 | 10.2 | 24.9 |
| 20 | 9.6 | 24.9 |
| 50 | 8.3 | 25.2 |
| 100 | 8.6 | 25.1 |
| 200 | 8.1 | 24.4 |
| 300 | 7.8 | 24.7 |
| 400 | 7.7 | 24.6 |
| 500 | 7.1 | 24.8 |
| 600 | 5.9 | 24.4 |

As can be seen, the hydrogenated sample not only gives a greater amount of friction reduction initially than the polyisoprene but also does not loose its ability to do so after 600 passes through the system. The polyisoprene sample shows a significant loss of friction reducing ability after 600 passes.

Percent friction reduction is known to be very sensitive to the molecular weight of the polymer. For instance, a 250 ppm concentration in cyclohexane of a $8.2 \times 10^5$ molecular weight polisobutylene was found to yield a 21.1% friction reduction while under the same conditions a $1.83 \times 10^6$ molecular weight polisobutylene was found to yield 57.2% friction reduction. Thus the loss of friction reducing ability with time or number of passes through a flow system is due to degradation of the polymer molecules.

EXAMPLE II

To compare rates of dissolution of the hydrogenated polyisoprene to those of copolymers of ethylenepropylene, 1.5 gm samples of each were placed in 200 cc's of cyclohexane and a West Texas crude oil. Beakers containing the polymer, solvent and a magnetic bob were placed on magnetic stirrers operating at approximately 60 rpm to provide gentle stirring to facilitate dissolution. The dissolution was allowed to proceed at room temperature. The polymers were deemed to have been completely dissolved when the solution appeared optically homogeneous and/or passed a fine mesh filter. The two polymers in this instance were a hydrogenated polyisoprene with an intrinsic viscosity of 6.85 dl/gm at 25°C in cyclohexane and an ethylene-propylene copolymer (53% ethylene) with an intrinsic viscosity of 6.7 dl/gm at 150°C in decalin. The results are shown in Table II in terms of hours required for complete dissolution.

Table II

Hours Required for Complete Dissolution at Room Temperature

| Polymer/Solvent | Cyclohexane | West Texas Crude Oil |
|---|---|---|
| Hydrogenated Polyisoprene | 22 | 70 |
| Ethylene-Propylene Copolymers | Not dissolved after 168 hours | Not dissolved after 168 hours |

EXAMPLE III

Small scale laboratory and full-scale field testing of hydrogenated polyisoprene having a molecular weight of approximately $7 \times 10^5$ was conducted with the following results.

Table III

| Pipe I.D. | 6.125-inch |
|---|---|
| Solvent | A West Texas crude oil |
| Temperature | 76°F |
| Viscosity | 5.08 cs |
| Density | 0.823 gm/cm³ |
| Flow Rate | 783 GPM |

| Concentration (ppm) | Friction Reduction (%) |
|---|---|
| 20 | 50 |
| 16 | 48 |
| 11 | 45 |
| 5 | 32 |
| 2 | 27 |

Table IV

| Pipe I.D. | 1.25-inch |
|---|---|
| Solvent | A West Texas crude oil |
| Temperature | 77°F |
| Viscosity | 13.04 cs |
| Density | 0.868 gm/cm³ |
| Concentration | 10 ppm |

Table IV—Continued

| Flow Rate (GPM) | Friction Reduction (%) |
|---|---|
| 15.14 | 26.3 |
| 23.69 | 47.5 |
| 33.91 | 58.7 |
| 49.45 | 71.4 |

Table V

| Pipe I.D. | 1.25-inch |
|---|---|
| Solvent | A West Texas crude oil |
| Temperature | 77°F |
| Viscosity | 5.95 cs |
| Density | 0.827 gm/cm³ |
| Concentration | 10 ppm |

| Flow Rate (GPM) | Friction Reduction (%) |
|---|---|
| 13.72 | 24.2 |
| 17.51 | 33.0 |
| 24.38 | 45.4 |
| 33.30 | 50.2 |

It will be understood that the hydrogenated polyisoprene additive should be soluble in the non-aqueous fluid being transferred. Examples of suitable fluids which are hydrocarbons and may be considered typical include hexane, pentane, cyclohexane, the isomers of octane, benzene, toluene and petroleum products such as crude oil, fuel oil and gasoline, as well as mixtures of such fluids.

We claim as our invention:

1. A method of reducing fluid flow friction loss in the transfer of a non-aqueous liquid medium through a pipe or conduit at high velocity which comprises intermixing with the medium from about 1 ppm to about 2,000 ppm of hydrogenated homopolymer of polyisoprene and flowing the intermixed medium and hydrogenated polyisoprene through said pipe or conduit.

2. A method according to claim 1 wherein the liquid medium is a hydrocarbon.

3. A method according to claim 1 wherein the hydrogenated polyisoprene has a molecular weight within the range of from about $1 \times 10^5$ to about $2 \times 10^7$.

* * * * *